(12) United States Patent
Dinan

(10) Patent No.: US 8,446,887 B2
(45) Date of Patent: *May 21, 2013

(54) METHODS AND DEVICES FOR SCHEDULING TRANSMISSIONS IN A WIRELESS NETWORK BASED ON CONTENTION AND CHANNEL CONDITIONS

(75) Inventor: Esmail Dinan, Herndon, VA (US)

(73) Assignee: Clearwire IP Holdings LLC, Bellevue, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/276,010

(22) Filed: Oct. 18, 2011

(65) Prior Publication Data
US 2012/0033651 A1    Feb. 9, 2012

Related U.S. Application Data

(63) Continuation of application No. 12/548,921, filed on Aug. 27, 2009, now Pat. No. 8,064,410.

(51) Int. Cl.
*H04W 74/04* (2009.01)

(52) U.S. Cl.
USPC .................................. 370/336; 370/345

(58) Field of Classification Search
USPC ................... 370/329, 336, 337, 345
See application file for complete search history.

(56) References Cited

U.S. PATENT DOCUMENTS

2010/0020760 A1* 1/2010 Grandblaise et al. ......... 370/330

* cited by examiner

*Primary Examiner* — Melvin Marcelo
(74) *Attorney, Agent, or Firm* — McDonnell Boehnen Hulbert & Berghoff LLP

(57) ABSTRACT

Methods and systems for assigning time-division multiplexed (TDM) slots in a multi-channel TDM system are presented. Preferably, a radio access network (RAN) assigns forward link and reverse link transmissions between the RAN and one or more wireless communication devices (WCDs) to TDM slots on various wireless channels. When making these assignments, the RAN may take into account (i) the priority of data that the RAN queues for the WCDs, and (ii) the signal quality at which the WCDs can receive the various wireless channels.

20 Claims, 7 Drawing Sheets

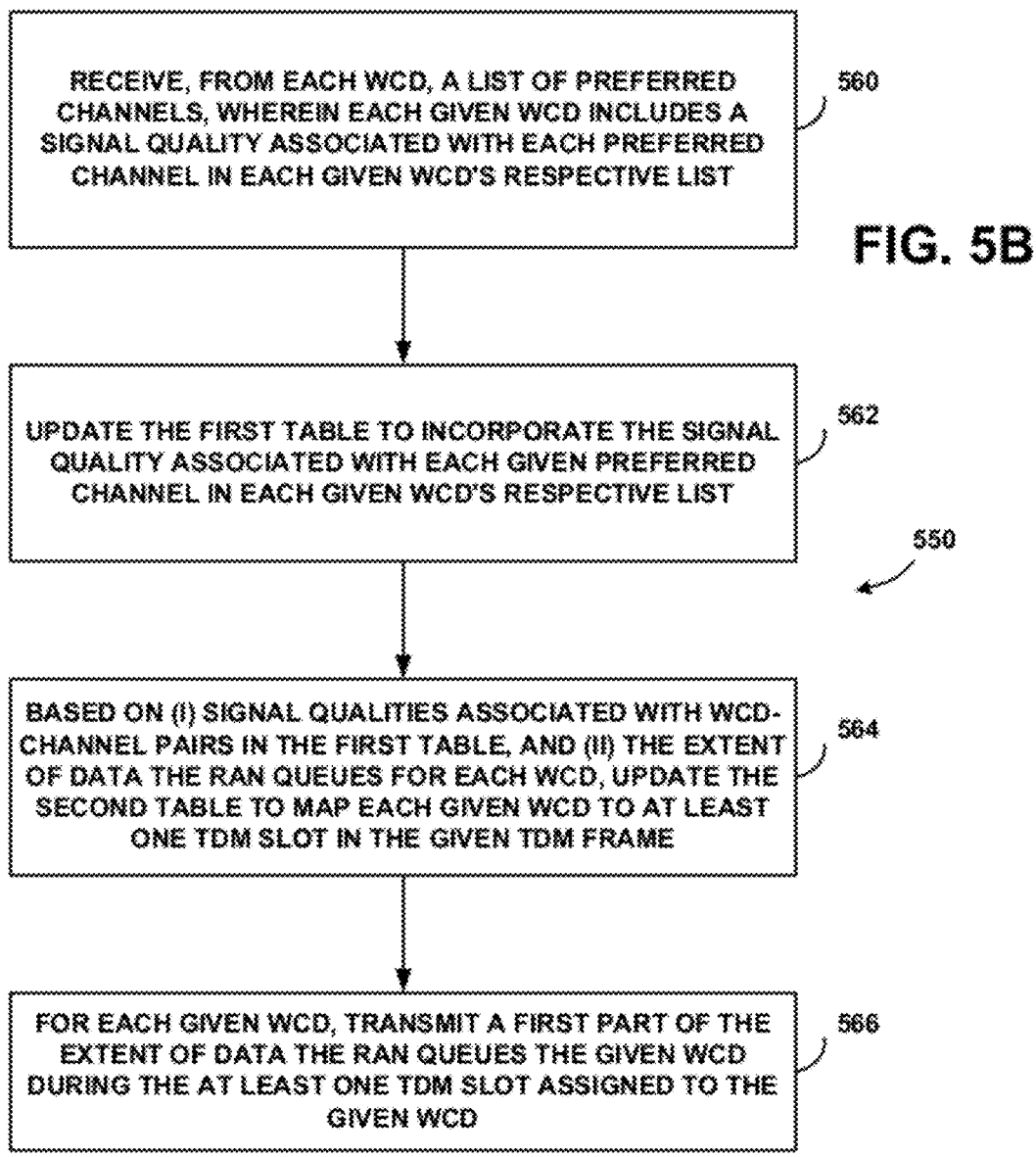

METHODS AND DEVICES FOR SCHEDULING TRANSMISSIONS IN A WIRELESS NETWORK BASED ON CONTENTION AND CHANNEL CONDITIONS

BACKGROUND

Wireless communication systems include so-called third generation (3G) and fourth generation (4G) networks. These systems may support multimedia services via high capacity data rates to and from wireless communication devices (WCDs). Some commercial wireless communication systems utilize multi-channel time division multiplexing (TDM), wherein a radio access network (RAN) may schedule transmissions to and from WCDs in timeslots on two or more wireless channels. However, performing this scheduling purely based on known techniques, such as first-come-first-served services or weighted fair queueing services, may result in inefficient use of the system's wireless capacity.

OVERVIEW

In order to make efficient use of the wireless capacity of multi-channel TDM RANs, new methods and devices for scheduling transmissions in a wireless network are presented. In particular, the embodiments herein may be able to operate with any existing multi-channel TDM scheduling technique. Thus, these embodiments may be commercially deployed on a wide range of systems. Furthermore, these embodiments may take into account both the priority of traffic to be communicated to or from WCDs and the relative wireless coverage quality of each WCD, in order to assign wireless capacity to the WCDs. As a result, this wireless capacity may be used in an efficient manner.

Thus, in a first embodiment, a RAN may support multiple wireless channels. One of these wireless channels may be a preferred channel, in the sense that it comprises a set of carrier frequencies that can be received by at least two WCDs. The preferred channel may operate according TDM, such that the capacity of the channel is divided into TDM frames, where each TDM frame comprises a series of TDM slots. Furthermore, the RAN may contain a first data to transmit to a first WCD and a second data to transmit to a second WCD. The first data and the second data may be associated with a first priority.

In this embodiment, the RAN may receive, from the first WCD, a first representation of the preferred channel. In the first representation, the first WCD may report that it can receive the set of carrier frequencies of the preferred channel with a first signal quality. Similarly, the RAN may receive, from a second WCD, a second representation of the preferred channel. In the second representation, the second WCD may report that it can receive the set of carrier frequencies of the preferred channel with a second signal quality. The first signal quality and the second signal quality may be considered to be channel conditions experienced by the first WCD and the second WCD, respectively.

Then, the RAN may make a first determination that the first WCD and the second WCD are both contending for a first TDM slot during a given TDM frame on the preferred channel. For instance, the RAN may operate according to any scheduling technique (i.e., a method used by a scheduler component of the RAN) that assigns TDM slots to WCDs. As a result of carrying out scheduling procedures according to this scheduling technique, the RAN may find that the first data and the second data are both candidates for transmission during the first TDM slot.

In order to decide which of the first data and the second data to transmit during the first TDM slot, the RAN may turn to the priorities associated with each of the first data and the second data. However, since the first data and the second data are both associated with the same priority, the RAN may consider other information as well when making this decision.

Thus, in response to making the first determination, the RAN may evaluate the first signal quality and the second signal quality. If the RAN determines that the first signal quality is greater than the second signal quality, the RAN may assign the first TDM slot to the first WCD, and then transmit the first data to the first WCD in the first TDM slot. In this way, the transmission during the first TDM slot is more likely to succeed.

Thus, for example, in situations where the RAN needs to transmit a first data to a first WCD and a second data to a second WCD, and these two transmissions are contending for the same TDM slot on a preferred channel, the may RAN consider the priorities of the first and second data and the channel conditions experienced by each WCD. In doing so, the RAN chooses to transmit to the WCD that is more likely to be able to successfully receive the transmission.

In a second embodiment, a RAN may communicate on a plurality of channels to a plurality of WCDs. Each channel may be comprised of a set of carrier frequencies, and each channel may operate according to TDM. Thus, each channel may also be divided into TDM frames, and each TDM frame may comprise a series of TDM slots.

Additionally, the RAN may maintain a first table associating each of the WCDs with a signal quality for each channel. This first table is preferably updated by the RAN each time a WCD reports on the signal quality with which the WCD can receive any of the channels. The RAN may maintain the first table in order to store a convenient reference for the signal quality at which each WCD receives each channel. The RAN may also maintain a second table mapping each of the WCDs to one or more of the TDM slots in a given frame. This second table may be a schedule of when the RAN transmits to and/or receives from the WCDs. For example, the second table may be filled out according to a scheduling technique. In addition to maintaining these tables, the RAN may queue an extent of data for each of the WCDs.

The RAN may receive, from each WCD of the plurality, a list of preferred channels. Preferably, each WCD includes a signal quality associated with each preferred channel in the respective WCD's respective list. Then, the RAN may update the first table to incorporate the signal quality associated with each preferred channel in each WCD's respective list.

Based on the signal qualities associated with WCD-channel pairs in the first table, and the extent of data the RAN queues for each WCD, the RAN may update the second table to map at least some WCD to at least some TDM slots in the given TDM frame. Then, according to the schedule as represented by the second table, the RAN may transmit at least a first part of the extent of data that the RAN queues for at least some WCDs during TDM slots assigned to these WCDs.

In this way, the RAN can take into account both the priority of data it queues for each WCD and the signal quality of the preferred channels of each WCD, when the RAN determines how to assign TDM slots to WCDs.

These and other aspects and advantages will become apparent to those of ordinary skill in the art by reading the following detailed description, with reference where appropriate to the accompanying drawings. Further, it should be understood that the foregoing overview is merely exemplary and is not intended to limit the scope of the invention as claimed.

BRIEF DESCRIPTION OF THE DRAWINGS

FIG. 5B is another flow chart, in accordance with an example embodiment; and

DESCRIPTION

Disclosed herein are methods and devices for scheduling multi-channel TDM transmissions in a wireless network. A RAN may use two or more wireless channels to exchange information with two or more WCDs. Each wireless channel may be comprised of a set of carrier frequencies. When determining an assignment of a WCD to a given TDM slot on a given channel, the RAN may take into account the priority of the data queued for each WCD, as well a representations of the signal quality at which each WCD may receive the set of carrier frequencies that form the given channel.

I. SYSTEM ARCHITECTURE

Figure 1:
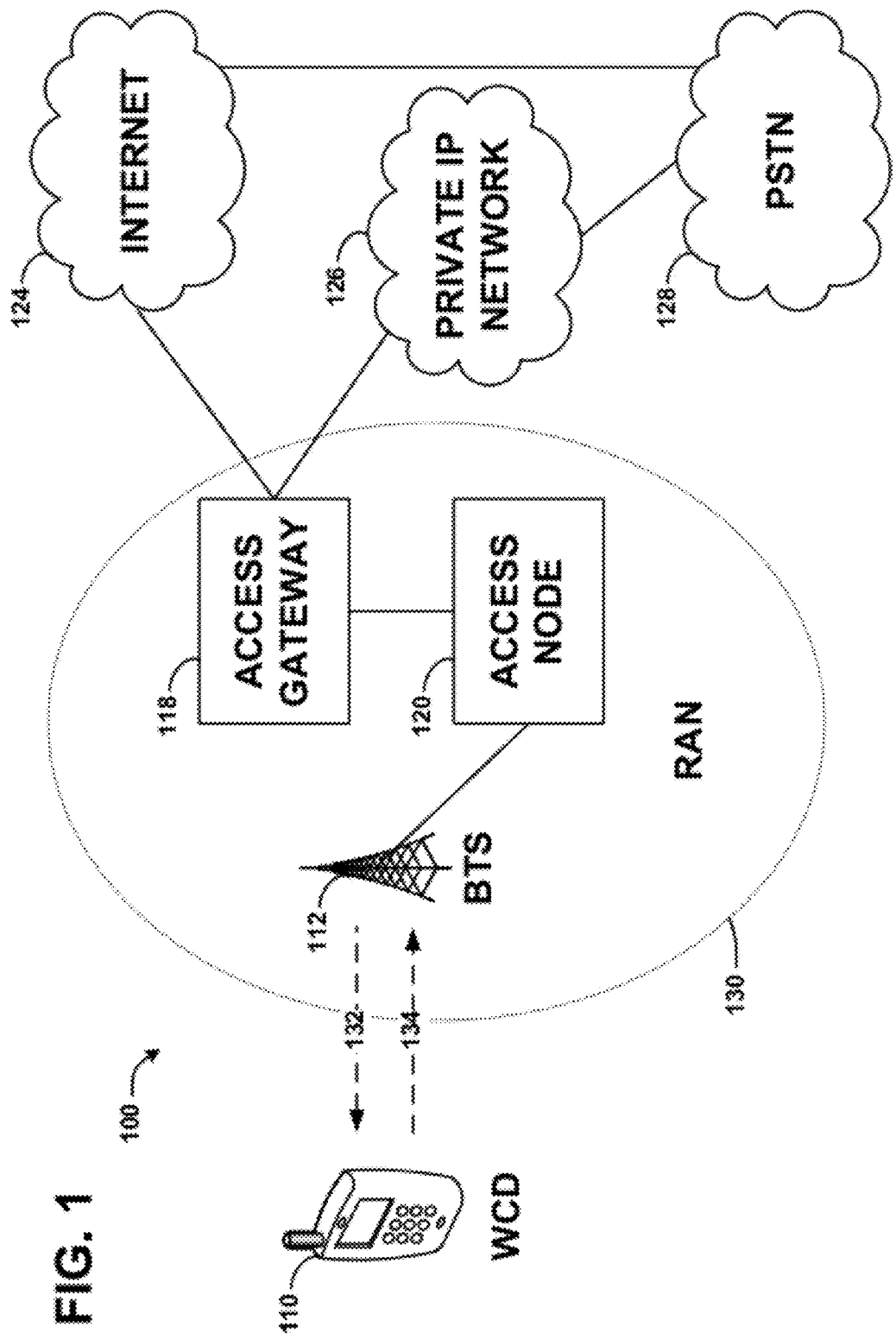
FIG. 1 depicts a communication system, in accordance with an example embodiment.

FIG. 1 is a simplified block diagram of example communication network 100, in which example embodiments may be employed. Network 100 may include a base transceiver station (BTS) 112 that can communicate with a WCD 110 via one or more wireless coverage areas. WCD 110 could be a wireless telephone, wireless personal digital assistant, wirelessly equipped laptop computer, wireless router, or another type of mobile or fixed wireless device.

BTS 112 may radiate to define the wireless coverage areas. Each wireless coverage area may provide air interface access to WCD 110 and any other WCDs served by the wireless coverage area. The air interface may include a forward link 132, supporting communication from BTS 112 to WCDs, and/or a reverse link 134, supporting communication from WCDs to BTS 112. These forward links and reverse links may use one or more of the same carrier frequencies to support this communication, or the forward and reverse link may use different carrier frequencies to support this communication. WCDs may exchange signaling, voice, data, video, or other media with BTS 112 through the forward and reverse links. In this regard, the WCDs may use the wireless coverage areas defined by BTS 112 to communicate with one or more endpoints. These endpoints may include other WCDs, e-mail servers, World Wide Web servers, gaming servers, media servers, media gateways, and/or location-based services. The communication may occur via a packet-switched network such as the Internet 124 or private IP network 126. Additionally, the communication may also traverse the public switched telephone network (PSTN) 128.

Via forward link 132 and reverse link 134, a WCD, such as WCD 110, may be communicatively coupled to a larger wireless communication network. As an illustrative example of a wireless communication network, BTS 112 may be communicatively coupled to an access node 120. Access node 120 may comprise a base station controller (BSC), a radio network controller (RNC), and/or a similar type of device. Access node 120 may, in turn, be communicatively coupled to packet-switched networks 124, 126 via an access gateway 118. Access node 120 may communicate with PSTN 128 via one or more media gateways (not shown) that bridge Internet 124 and/or private IP network 126 to PSTN 128. Alternatively, the RAN may communicate directly with PSTN 128.

Although FIG. 1 shows only one BTS, network 100 may include more than one BTS. Each BTS may be communicatively coupled to access node 120 or to other network elements. Furthermore, WCD 110 may be able to transfer ongoing communication sessions from one BTS to another in a handoff process. WCD 110 may also be handed off between two wireless coverage areas defined by the same BTS. Additionally, network 100 may include multiple access nodes, and AGWs.

The combination of network elements including BTS 112, access node 120, and access gateway 118 may be collectively referred to as a RAN, and these elements are designated as components of RAN 130. However, RAN 130 may also be defined to comprise more or fewer elements. For example, RAN 130 may comprise multiple BTSs, access nodes, and/or AGWs.

Furthermore, these elements may be combined with one another; for example, some combination of a BTS, an AGW, and an access node may be physically co-located or may be logical components of the same physical element. Thus, it should be understood that any communications described herein as being between a WCD and a RAN may take place between a WCD and any component of a RAN. For example, these communications could take place between WCD 110 and access node 120, or between WCD 110 and BTS 112.

The entity or entities of RAN 130 preferably include at least one processor, data storage, and program instructions stored in the data storage and executable by the processor to carry out RAN functions described herein. Similarly, a WCD preferably includes at least one processor, data storage, and program instructions stored in the data storage and executable by the processor to carry out WCD functions. Furthermore, the WCDs and RAN 130 may communicate with each other in accordance to various types of wireless protocols, such as Worldwide Interoperability for Microwave Access (WIMAX®), Integrated Digital Enhanced Network (iDEN®), Code Division Multiple Access (CDMA), Universal Mobile Telecommunications System (UMTS), Long Term Evolution (LTE®), IEEE 802.11 (WIFI®), or other protocols now known or later developed.

II. MULTI-CHANNEL TDM

Preferably, RAN 130 communicates with WCD 110, as well as any other WCDs served by RAN 130, via multi-channel TDM. Using multi-channel TDM, an extent of wireless bandwidth may be divided into two or more channels, and each of these channels may operate according to TDM.

These wireless channels may be formed using various technologies, such as, but not limited to, frequency-division multiplexing (FDM), orthogonal frequency-division multiplexing (OFDM), and wave-division multiplexing (WDM). To this end, each channel may comprise one or more carrier frequencies and/or sub-carrier frequencies. These carrier frequencies and/or sub-carrier frequencies may be adjacent to one another, or distributed throughout any portion of wireless bandwidth. In other words, any given channel may comprise a set of contiguous frequencies, or may instead comprise a set of non-contiguous frequencies. For purposes of simplicity, the term "carrier frequency" may be used herein to represent both carrier frequencies and sub-carrier frequencies.

Regardless of how each channel is formed, more than one WCD may share the capacity of each channel via TDM. Accordingly, the RAN may schedule transmissions to and from WCDs on each channel in TDM slots. Each TDM slot may contain one or more symbols, and each symbol may represent one or more bits (e.g., a symbol may represent a string of zeros and/or ones). A contiguous grouping of a number of slots may be referred to as a frame. Alternatively, a frame may be divided into two or more sub-frames and interleaved with each other so that the slots in a given frame are not contiguous.

Preferably, the RAN contains at least one forward link buffer. Such a forward link buffer may queue packets the RAN receives from endpoints in communication with WCDs served by the RAN. These endpoints may be devices or systems attached to a packet-switched network, such as Internet 124 or Private IP Network 126, or may be circuit-switched devices communicatively coupled to the RAN by a signaling gateway or a media gateway. The RAN preferably transmits each packet queued in the forward link buffer to the packet's destination WCD during one or more TDM slots of a multi-channel TDM schedule.

Thus, for example, the RAN may receive a packet for a given WCD, and queue this packet in a forward link buffer for later transmission. The RAN may then identify one or more TDM slots on a given wireless channel on which to transmit the packet to the given WCD (i.e., depending on the capacity of TDM slots, the RAN may be able to transmit the packet to the given WCD in a single TDM slot, or the RAN may use multiple TDM slots to transmit the packet). Alternatively, the RAN may identify one or more TDM slots on two or more wireless channels on which to transmit the packet to the given WCD. For sake of simplicity, the term "data" may be used to represent one or more packets, or information from one or more packets, that may be queued at the RAN for a WCD.

Figure 2:
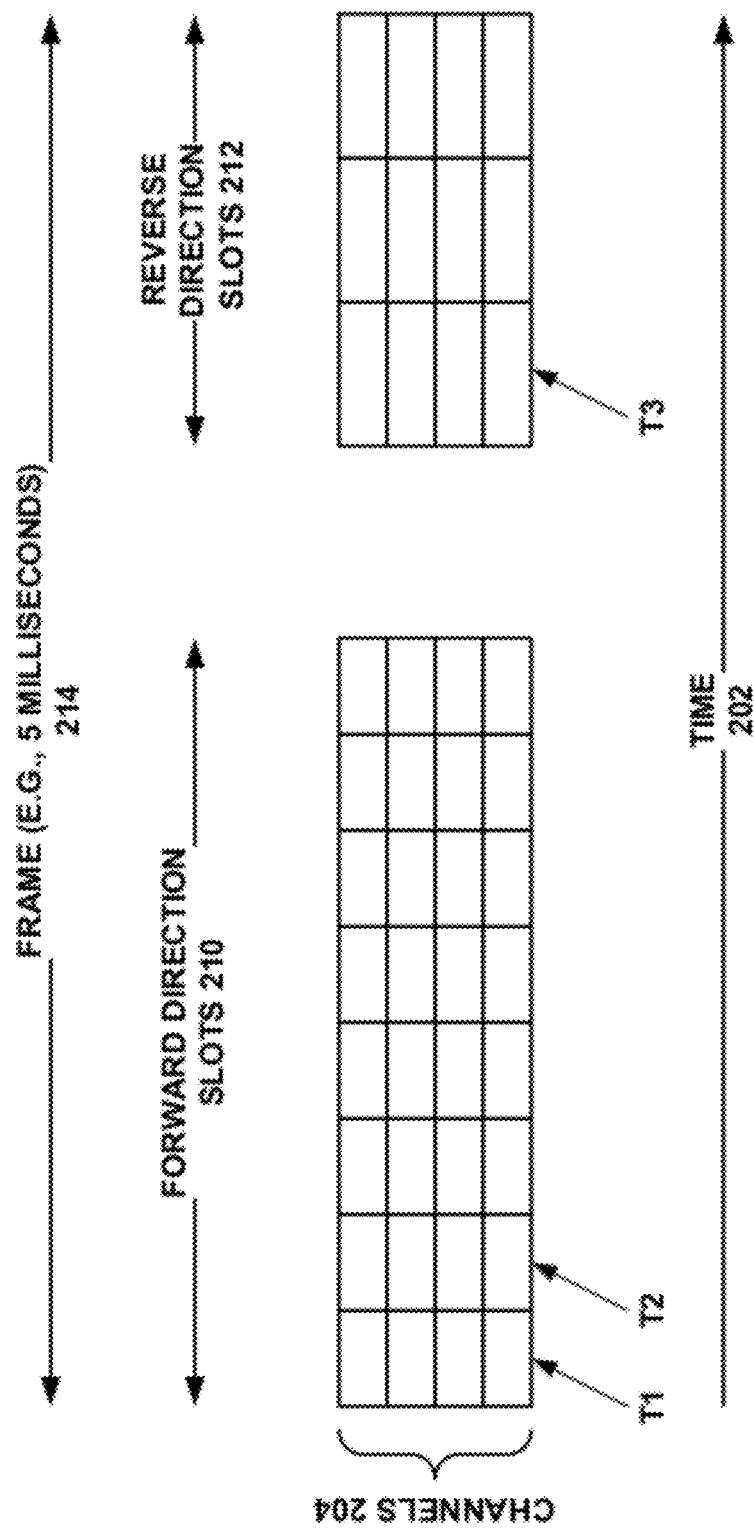
FIG. 2 depicts an example multi-channel TDM schedule, in accordance with an example embodiment.

FIG. 2 provides an illustrative example of a visualization of multi-channel TDM. In FIG. 2, time 202 is represented on the x axis, flowing from left to right. Channels 204 are represented on the y axis. One frame 214 of TDM slots 212 is shown in FIG. 2, and this frame includes 8 forward direction slots 210 and 3 reverse direction slots for each of the channels 204. Thus, for example, at time T1, RAN 130 may transmit one or more symbols on each of channels 204. RAN 130 may transmit one or more symbols on each of channels 204 again at time T2. Also, at time T3, RAN 130 may receive one or more symbols on each of channels 204.

FIG. 2 illustrates a form of communication that may be referred to as time-division duplexing (TDD). In such a system, a portion of the time in a TDM frame may be reserved for a RAN to transmit to WCDs (i.e., forward direction transmissions that take place on a forward link), and another portion of the time may be reserved for the RAN to receive from WCDs (i.e., reverse direction transmissions that take place on a reverse link). However, FIG. 2 illustrates TDD only for purposes of example. The embodiments herein could alternatively operate according to frequency-division duplexing (FDD). In an FDD system, some channels are used only for forward direction transmissions while other channels are only used for reverse direction transmissions. Thus, a TDM frame, such as frame 214, may contain only forward direction slots, only reverse direction slots, or some combination of both.

Furthermore, the frame 214 illustrated in FIG. 2 could have more or fewer slots, and each slot could support the transmission or reception of any number of symbols. If, for instance, each forward direction slot 210 in frame 214 contains 2 symbols, and each reverse direction slot 212 in frame 214 contains 3 symbols, then RAN 130 could transmit a total of 12 symbols and receive a total of 9 symbols during frame 214 on each of channels 204.

A symbol may be a waveform that represents one or more bits. The types of waveforms available for use on a given channel may be based on the encoding and modulation that the given channel is capable of supporting. For example, if channels 204 are capable of supporting quadrature phase shift keying (QPSK) modulation, then each symbol in a slot on channels 204 may encode 2 bits. Alternatively, channels 204 may be capable of supporting quadrature amplitude modulation schemes (QAM), such as 64-QAM. For instance, using 64-QAM on channels 204 may result in each symbol encoding 6 bits. Of course, other encoding schemes beside QPSK and 64-QAM could be used.

Thus, assuming 6 bits per symbol and 2 symbols per slot, the peak forward direction capacity of frame 214 is 96 bits. Furthermore, if frame 214 is 5 milliseconds in length, then the total forward direction bitrate for each of channels 204 would be 19,200 bits per second. However, if RAN 130 uses a different number of bits per symbol, symbols per slot, or slots per frame, the total forward direction bitrate may be different.

Generally speaking, it is desirable to encode as many bits as possible in a given symbol. Doing so increases the efficiency and the data rate of a communication system. However, encoding schemes that support more bits per symbol also tend to be less resilient to wireless link impairments, such as distortion, attenuation, cross-talk, and other types of interference. Thus, in some situations, using fewer bits per symbol (e.g., QPSK) may be more effective than using more bits per symbol (e.g., 64-QAM).

In order to adapt to changing wireless conditions between a given WCD and RAN 130, the given WCD and/or RAN 130 may change the encoding that it uses on a per frame, per slot, or per symbol basis. Thus, for instance, if RAN 130 determines that the given WCD is receiving the transmissions of RAN 130 with a poor signal quality, RAN 130 may change to an encoding that supports fewer bits per symbol. Conversely, if RAN 130 determines that the given WCD is receiving the transmissions of RAN 130 with a good signal quality, RAN 130 may change to an encoding that supports more bits per symbol.

In general, the operations associated with assigning transmissions of data (in the form of symbols) to TDM slots (or, more specifically, assigning a given WCD to transmit or receive data in a given TDM slot), may be referred to as scheduling. Thus, an assignment of WCDs to TDM slots (such as the TDM slots illustrated in FIG. 2), may be referred to as a schedule. A RAN may take into account multiple factors and/or constraints when determining a schedule.

For example, a RAN may attempt to schedule transmissions on a first-come-first-served basis, where the RAN may schedule the transmission of data to WCDs in the order in which the data arrived at the RAN. Alternatively, the RAN may use other scheduling techniques, such as weighted fair queueing, where the RAN may schedule the out-of-order transmission of data according to weights associated with the data or weights associated with the WCDs.

Scheduling transmissions on multi-channel TDM systems may also take into account one or more quality of service (QOS) parameters of the data queued for transmission. Some types of applications, for instance, QOS-sensitive applications, in particular latency-sensitive applications, may benefit from include taking these parameters into account. Latency-sensitive applications include voice over Internet Protocol (VoIP), push-to-talk (PTT), multi-media calling (e.g., voice, video, and/or data shared on a call between two or more participants), gaming, streaming audio, streaming video, and other types of applications now known or later developed. In general, the usability of latency-sensitive applications may dramatically decrease when these applications are subject to network delay. On the other hand, other types of applications, such as email and web-browsing applications, may be able to absorb a greater degree of network delay before their usability is diminished.

For example, in conjunction with determining a multi-channel TDM schedule, a RAN may not be able to schedule the transmissions of all data that is queued at the RAN in the same TDM frame. Thus, at least two instances of data may be contending for a given TDM slot in the given TDM frame. If both instances of this contending data is destined to the same WCD, then the RAN may determine which of the two instances of data to transmit first (e.g., in the given TDM slot), and which to transmit second (e.g., in a later TDM slot that is possibly in a later TDM frame). However, if one of the two instances of data is destined to a first WCD and the other instance of data is destined to a second WCD, then the first and second WCDs may be contending for the given TDM slot. Therefore, the RAN may determine which WCD to assign the given TDM slot. To do so, the RAN may consider various types of QOS information, including, but not limited to priorities associated with the first data and the second data.

Accordingly, suppose that the RAN determines that a first WCD and a second WCD are contending for a given TDM slot on a given channel. Suppose further than the data queued for the first WCD is associated with a first priority and that the data queued for the second WCD is associated with a second priority, where the first priority is greater than the second priority (meaning, in this example, that data associated with the first priority is more latency-sensitive than data associated with the second priority). Then, the RAN may grant the first WCD the given TDM slot, because the data queued for the first WCD is more latency-sensitive than the data queued for the second WCD. The RAN may then transmit the data queued for the first WCD in the given slot, and either transmit the data queued for the second WCD at a later point in time, or discard the data queued for the second WCD.

The RAN may use various types of mechanisms to determine the priority of data queued for WCDs. In situations where the data is from one or more Internet Protocol (IP) packets, or is derived from one or more IP packets, the RAN may use various IP differentiated services standard defined by Internet Engineering Task Force (IETF) Request for Comments (RFC) 2474 to determine the priorities associated with each data. RFC 2474 incorporated by reference in its entirety herein.

For example, an endpoint in communication with a WCD, such as a media server, may mark the packets that it transmits to the WCD with a differentiated services code point (DSCP) marking. The DSCP marking preferably contains a value designating a desired treatment of the packet. A DSCP marking may consist of one or more bits in a pattern that can be interpreted to specify a forwarding preference and/or a drop preference. For instance, assuming for the moment that the DSCP consists of six bits, the pattern 001010 may indicate the highest level of forwarding preference (potentially resulting in less latency for data associated with that pattern), while the pattern 000000 may indicate a best effort service (potentially resulting in more latency for data containing that pattern).

Of course, the RAN may use other mechanisms to determine the priority of data that it queues for WCDs. Regardless of the exact mechanism that the RAN uses, the RAN preferably receives an IP packet, and determines a priority associated with the IP packet. RAN 130 may then divide the IP packet into one or more instances of data to transmit to a WCD. Preferably, RAN 130 associates each of these instances of data with the priority of the IP packet. Then, RAN 130 may take these priorities into account when it assigns TDM slots to WCDs.

It should be understood that this process of associating data with a priority is described above for the forward direction. The RAN may also associate data to be transmitted in the reverse direction with a priority. For example, a WCD that has data of a given priority to transmit to the RAN may indicate to the RAN that the WCD desires one or more reverse direction TDM slots for transmission of data with the given priority. Based on this indication, the given priority, and possibly other factors as well, the RAN may grant reverse direction TDM slots to the WCD for such as transmission.

Figure 3:
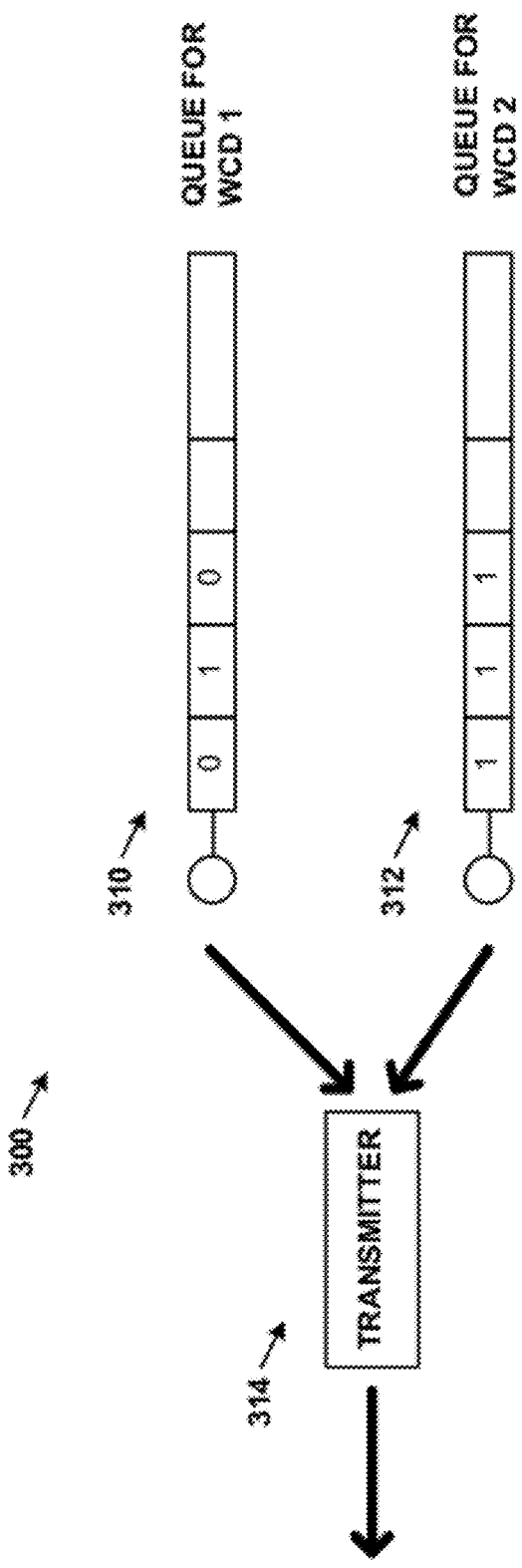
FIG. 3 depicts buffers queueing data of various priorities, in accordance with an example embodiment.

FIG. 3 is an illustration 300 of forward direction data queued at a RAN component. The RAN component may be, for example, a BTS or an access node. The RAN component may contain queue 310, for holding data to be transmitted to a first WCD (i.e., WCD 1), and queue 312 for holding data to be transmitted to a second WCD (i.e., WCD 2). For purposes of simplicity, each instance of data held in either queue 310 or queue 312 may be associated with a priority of 0 (zero) or 1 (one). A priority of 0 preferably indicates that the instance of data is best effort, while a priority of 1 preferably indicates that the instance of data is latency-sensitive. Of course, additional levels of priority may be used in place of the two levels of priority used in this illustrative example. It should be understood that the RAN component may serve more than two WCDs, the RAN component may contain more than two queues, and the data in the queues may be associated with more than two priorities.

Accordingly, if the RAN component determines that data from queue 310 is contending with data from queue 312 for a given TDM slot, the RAN component may consider the priorities associated with the data in each queue. In the illustration 300, there are two general conditions that the RAN component may consider.

The first condition is when the data of one queue is associated with a priority of 0 and the data of the other queue is associated with a priority of 1. In this case, the RAN component preferably assigns the data associated with the priority of 1 to the TDM slot. The RAN may do so because in general it is advantageous for the RAN to prioritize latency-sensitive data over best-effort data. The second condition is when the data in both queues is associated with a priority of 0 or with a priority of 1. In this case, the data in both queues is associated with the same priority, just considering the priorities associated with the first data and the second data may not help the RAN determine which data to transmit in the given TDM slot. Thus, the RAN may take other factors into account in order to select which of the first data and the second data to transmit in the given TDM slot. Regardless of how a instance of data is ultimately selected, the RAN component preferably forwards the selected instance of data to transmitter 314 for transmission to the destination WCD.

With respect to how the RAN may select one of the first data and the second data, the RAN, may use various tie-breaking mechanisms in situations where both frames of data contending for the given TDM slot are associated with the same priority. For example, the RAN may consider the signal quality at which each WCD can receive the given TDM slot's channel, and assign the TDM slot to the WCD that receives the channel at a higher signal quality. By doing so, the RAN may (i) transmit to the WCD that is more likely to be able to successfully receive the transmission, and (ii) use an encoding with more bits per symbol for the transmission, thereby potentially improving the efficiency and data rate of the wireless communication system.

Figure 4:
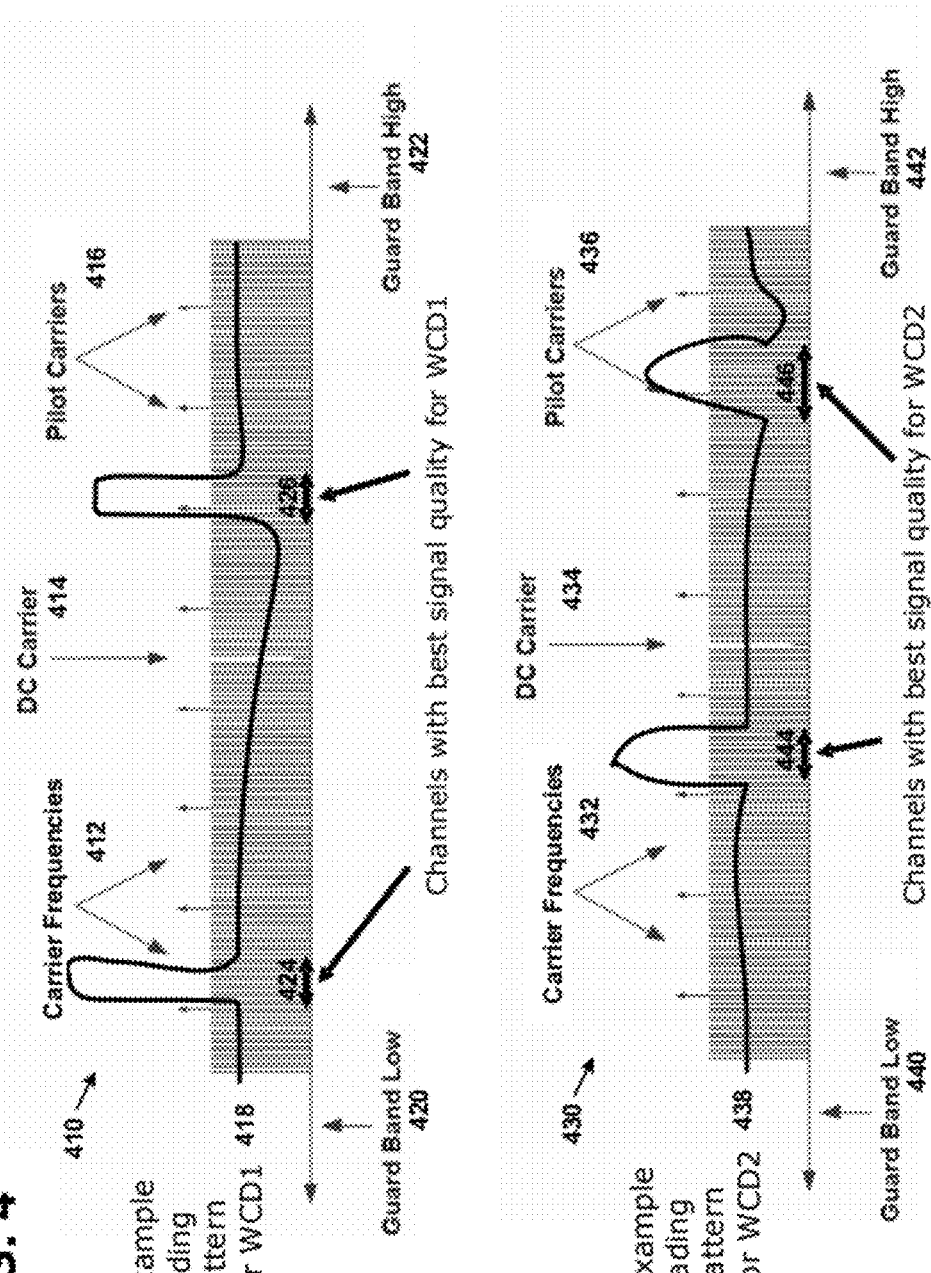
FIG. 4 depicts example fading patterns across multiple frequencies, in accordance with an example embodiment.

The signal quality that a WCD experiences can take various forms. FIG. 4 illustrates signal qualities across multiple frequencies in the form of a fading pattern. Example fading pattern 410 illustrates the relative signal quality for a first WCD (i.e., WCD1) over carrier frequencies 412. Carrier frequencies 412 are preferably centered around direct current (DC) carrier 414. Additionally, a number of pilot carriers 416 may be interspersed amongst carrier frequencies 412. A pilot frequency is preferably used by a RAN to transport a pilot signal. Such a pilot signal may be used by WCDs as a representation of signal strength in a given range of frequencies near the pilot frequency.

Carrier frequencies 412 may be contiguous to one another (as is shown in example fading pattern 410) or a group of non-contiguous carrier frequencies. Furthermore, carrier frequencies 412 may be separated from other carrier frequencies by a low guard band 420 and a high guard band 422.

Example fading pattern 430 illustrates a similar arrangement, in which carrier frequencies 432 are preferably centered around DC carrier 434, with one or more pilot carriers 436 interspersed within carrier frequencies 432. Carrier frequencies 432 may also be separated from other carrier frequencies by a low guard band 440 and a high guard band 442.

Example fading patterns 410 and 430 contain frequency-dependent signal qualities 418 and 438, respectively. Signal quality 418 may represent per-frequency signal qualities as received by WCD1. Thus, for example, WCD1 may receive carrier frequencies in range 424 and range 426 at a greater quality than WCD1 receives any other carrier frequency ranges of carrier frequencies 412. This could be due to various factors, such as communication between the RAN and WCD1 on carrier frequencies in range 424 and range 426 being subject to less interference, attenuation, crosstalk, and/or distortion than communication on other carrier frequencies.

Similarly, signal quality 438 may represent per-frequency signal qualities as received by WCD2. Thus, for example, WCD2 may receive carrier frequencies in range 444 and range 446 at a greater quality than WCD2 receives any other carrier frequency ranges of carrier frequencies 432. This could be due to various factors, such as communication between the RAN and WCD2 on carrier frequencies in range 444 and range 446 being subject to less interference, attenuation, crosstalk, and/or distortion than communication on other carrier frequencies.

As illustrated in FIG. 4, there may be situations where the carrier frequencies that form a wireless channel can be received with a better signal quality by WCD1 than WCD2, or vice versa. For instance, suppose that WCD1 and WCD2 are contending for a given TDM slot on a given channel, and the given channel uses carrier frequencies in range 424 or range 426. In this situation, it may be desirable for a RAN to assign the given TDM slot to WCD1, since WCD1 has a better chance of receiving the RAN's transmissions, and may be able to receive these transmissions as a greater data rate. On the other hand, if the given channel uses carrier frequencies in range 444 or range 446, it may be desirable for a RAN to assign the given TDM slot to WCD2, since WCD2 has a better chance of receiving the RAN's transmissions, and may be able to receive these transmissions as a greater data rate.

One way in which WCD1 may be able to determine signal quality 418 would be for WCD1 to listen to pilot carriers 416. From the strengths at which WCD1 receives these associated pilot signals, WCD1 may be able to determine signal quality 418, and transmit a representation of at least part of signal quality 418 to the RAN (for instance, WCD1 may transmit, to the RAN, the signal strength in decibels at which WCD1 receives a pilot signal). Similarly, WCD2 may be able to determine signal quality 438 by listening to pilot carriers 436. Alternatively, WCD1, WCD2, and/or the RAN may use other means for determining signal qualities 418 and 438.

It should be understood that if a wireless channel is formed from multiple carrier frequencies, a given WCD may not receive all of these carrier frequencies at the same signal quality. Thus, the signal quality that a WCD or a RAN associated with a wireless channel may be based on the signal qualities associated with one or more carrier frequencies that form the wireless channel.

It should also be understood that the illustrations in FIG. 4 are merely for purposes of example. With respect to the embodiments disclosed herein, other arrangements of carrier frequencies, pilot frequencies, DC carriers, and signal qualities may be used. Regardless, these embodiments describe how a RAN may be able to consider both data priority and wireless signal quality when assigning WCDs to TDM slots in a multi-channel TDM schedule.

III. EXEMPLARY METHODS

Figure 5A:
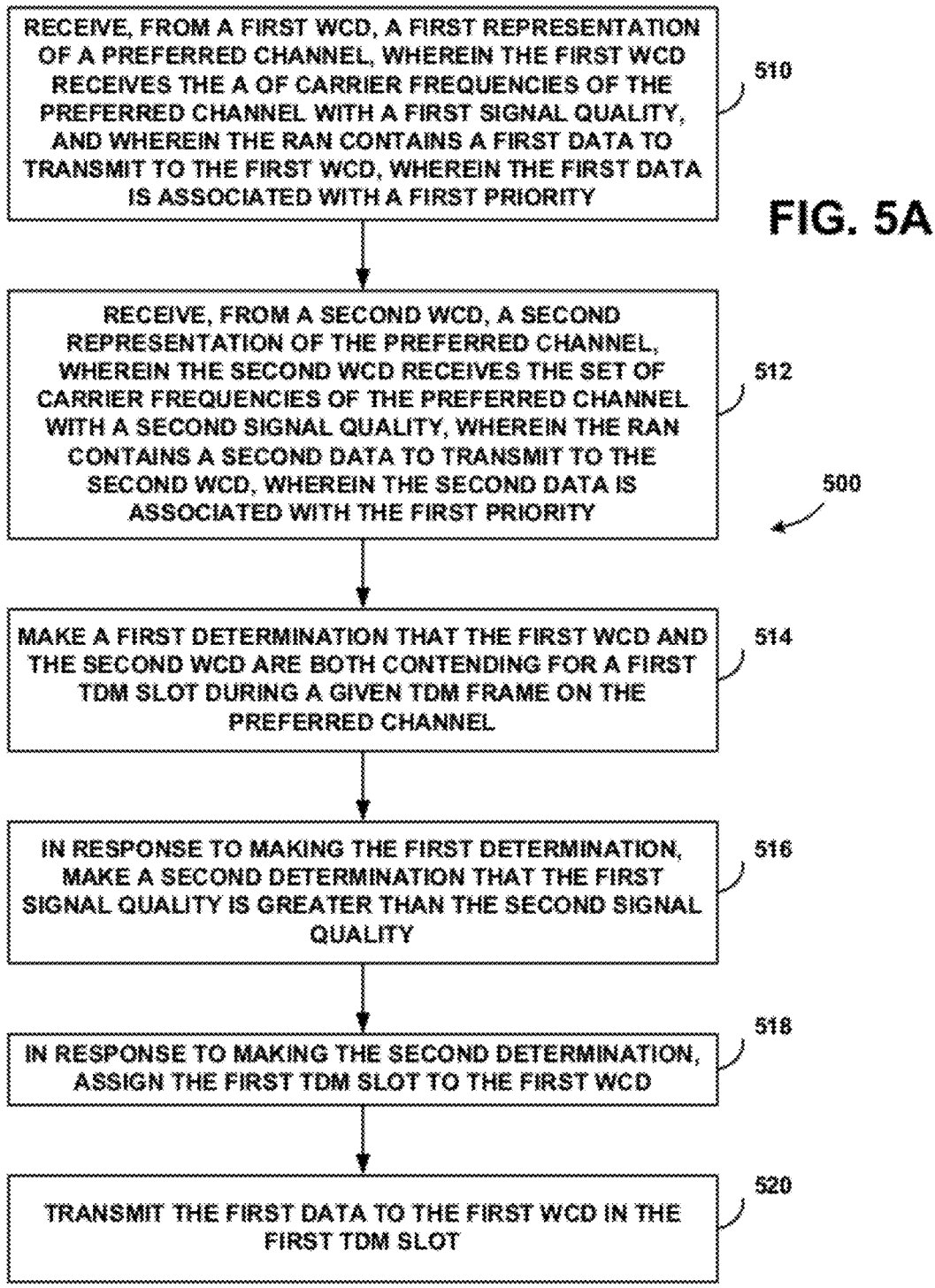
FIG. 5A is a flow chart, in accordance with an example embodiment.

FIGS. 5A and 5B are flow charts illustrating methods for assigning WCDs to TDM slots in a multi-channel TDM system. It should be understood that for each method depicted in these figures, more or fewer steps may be used, and the steps may occur in a different order. Furthermore, the methods depicted in these figures may be combined, in whole or in part, and still be within the scope of the preferred embodiments. Generally speaking, the methods of FIGS. 5A and 5B can be used by a RAN to assign WCDs to TDM slots on wireless channels. When making these assignments, the RAN may consider the priority of data the RAN queues for each respective WCD, as well as the signal quality at which the WCD can receive one or more of the wireless channels.

FIG. 5A depicts method 500 for determining whether to assign a first TDM slot on a preferred channel to a first WCD or a second WCD. The preferred channel may be comprised of a set of carrier frequencies. Method 500 may take place at a RAN, and the RAN may queue a first data, associated with a first priority, to transmit to the first WCD, and a second data, also associated with a first priority, to transmit to the second WCD. Preferably, the first data is associated with a first flow of packets (e.g., latency-sensitive packets), and the second data is associated with a second flow of packets (e.g., a different flow of latency-sensitive packets).

Accordingly, at step 510, the RAN may receive, from the first WCD, a first representation of the preferred channel. The first representation may indicate that the first WCD may receive the set of carrier frequencies with a first signal quality. At step 512, the RAN may receive, from the second WCD, a second representation of the preferred channel. The second representation may indicate that the second WCD receives the set of carrier frequencies with a second signal quality.

At step 514, the RAN may make a first determination that the first WCD and the second WCD are both contending for the first TDM slot during a given TDM frame on the preferred channel. This first determination may be based, at least in part, on both the first data and the second data being associated with the first priority. At step 516, in response to making the first determination, the RAN may make a second determination that the first signal quality is greater than the second signal quality. Then, at step 518, in response to making the second determination, the RAN may assign the first TDM slot to the first WCD, and at step 520, the RAN may transmit the first data to the first WCD in the first TDM slot. In this way, the RAN may consider the priorities of the first data and the second data, as well as the wireless signal quality available to each WCD, in assigning the first TDM slot to one of the contending WCDs.

After assigning the first TDM slot to the first WCD, the RAN may assign a second TDM slot to the second WCD and then transmit the second data to the second WCD after the RAN transmits the first data to the first WCD. Alternatively, the RAN may instead discard the second data.

Additionally, the RAN may contain a third data to transmit to a third WCD. The third data may be associated with a second priority, where the first priority is higher than the second priority. If the RAN also determines that the third WCD is contending for the first TDM slot, the RAN may assign the second TDM slot to the third WCD, and transmit the third data to the third WCD after the RAN transmits the first data to the first WCD.

Furthermore, the RAN may support both forward direction and reverse direction transmissions in the given TDM frame. For example, the RAN may be a TDD system. In this case, the first TDM slot is preferably a forward direction TDM slot. Accordingly, the RAN may receive, from the first WCD, a request to transmit in the reverse direction during the given TDM frame. Based at least on receiving the request, the RAN may assign at least one reverse direction TDM slot in the given TDM frame to the first WCD for the first WCD to transmit in. Then, the RAN may receive a third data from the first WCD in the at least one reverse direction TDM slot.

Moreover, the RAN may also contain a third data to transmit to the first WCD, and a fourth data to transmit to the second WCD. The RAN may also make a third determination that the first WCD and the second WCD are also both contending for a second TDM slot during the given TDM frame on the preferred channel. In response to making the third determination, the RAN may assign the second TDM slot to the second WCD, and after assigning the second TDM slot to the second WCD, the RAN may transmit the fourth data to the second WCD in the given slot.

FIG. 5B illustrates a method 550 for the RAN to schedule transmissions to WCDs in a multi-channel TDM system. The RAN preferably maintains a first table associating each of the WCDs with a signal quality for each channel in the system, and a second table mapping each of the WCDs to one or more of the TDM slots in the given frame. Thus, the first table maintains a signal quality reference for each WCD, while the second table maintains a schedule of transmissions from the RAN to WCDs (and possibly from WCDs to the RAN as well). Both the first table and the second table may be updated from time to time. The RAN may also queue an extent of data for each of the WCDs.

At step 560, the RAN may receive, from each WCD, a list of preferred channels. Each given WCD may choose preferred channels in each given list from the channels of the multi-channel TDM system. Along with a respective list of preferred channels, each given WCD may also include a signal quality associated with each preferred channel in the respective list.

At step 562, the RAN may update the first table to incorporate the signal quality associated with each given preferred channel in each given WCD's respective list. At step 564, based on (i) signal qualities associated with WCD-channel pairs in the first table, and (ii) the extent of data the RAN queues for each WCD, the RAN may update the second table to map each given WCD to at least one TDM slot in the given TDM frame. Then, at step 566, for each given WCD, the RAN may transmit a first part of the extent of data the RAN queues the given WCD during the at least one TDM slot assigned to the given WCD.

Furthermore, the extent of data that the RAN queues for each WCD may be associated with a first priority or a second priority. Accordingly, when updating the second table to map each given WCD to at least one TDM slot in the given TDM frame, the RAN may (i) determine a first set of WCDs where, for each WCD in the first set, the extent of data the RAN queues for each WCD is associated with the first priority, (ii) determine a second set of WCDs, wherein, for each WCD in the second set, the extent of data the RAN queues for each WCD is associated with the second priority. Preferably, the first set and the second set are mutually exclusive. Then, when updating the second table, the RAN may map each WCD in the first set to a TDM slot before the RAN maps any WCD in the second set to a slot. In this way, the RAN may grant the first set of WCDs priority over the second set of WCDs.

Regardless of how the schedule is formed, if the RAN determines that a first WCD of the first set and a second WCD of the second set are contending for a given TDM slot during the given TDM frame, the RAN may further determine from the first table that the first WCD is associated with a higher signal quality for the given channel than the second WCD. Accordingly, the RAN may update the second table to map the first WCD to the given TDM slot.

Additionally, the extent of data associated with each given WCD may include a first part and a second part, where the first part and the second part may each be associated with a different priority. Thus, for some WCD, the RAN may transmit a second part of the extent of data that the RAN queues for those WCDs after the given TDM frame.

IV. EXEMPLARY RAN COMPONENT

Figure 6:
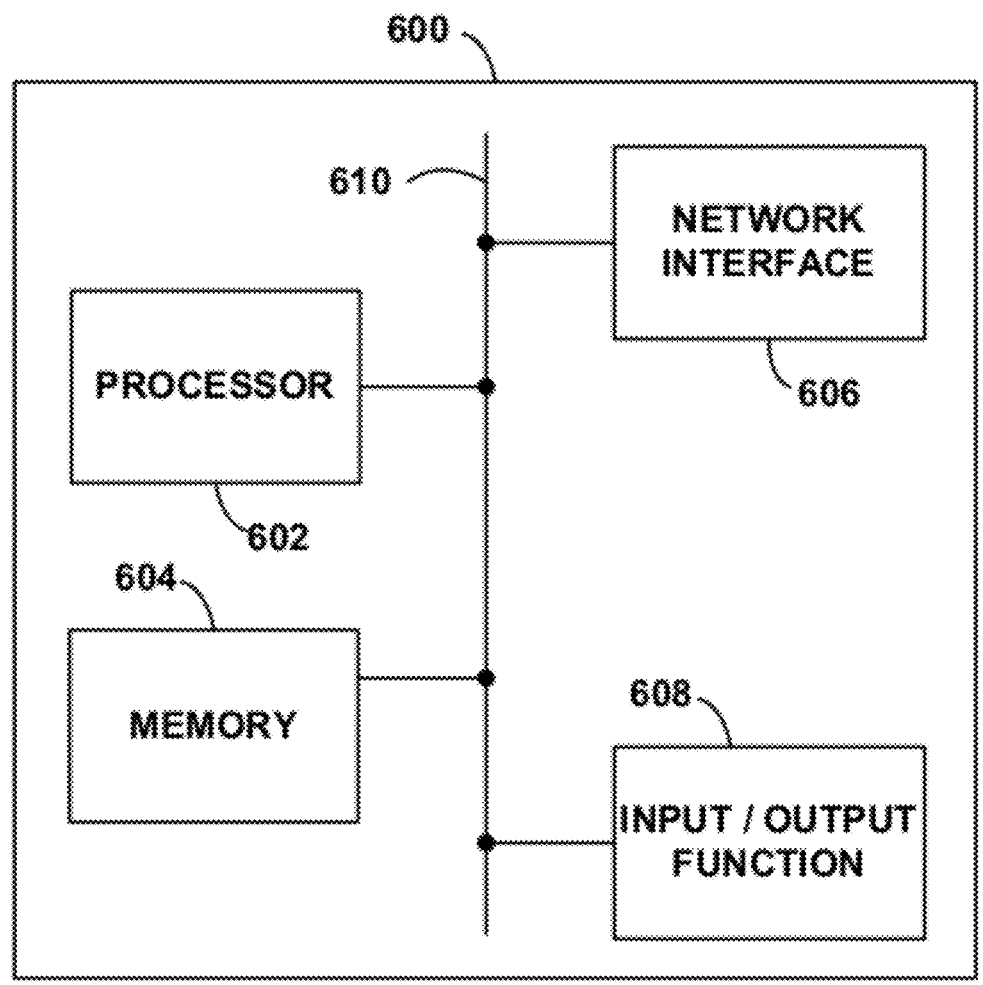
FIG. 6 is a block diagram of an example RAN component, in accordance with an example embodiment.

FIG. 6 is a simplified block diagram depicting an exemplary representation of a RAN component. FIG. 6 illustrates some of the functional components that would likely be found in a RAN component arranged to operate in accordance with the embodiments herein. The RAN component preferably includes a processor 602, a memory 604, a network interface 606, and an input/output function 608, all of which may be coupled by a system bus 610 or a similar mechanism.

Processor 602 preferably includes one or more CPUs, such as one or more general purpose processors and/or one or more dedicated processors (e.g., application specific integrated circuits (ASICs) or digital signal processors (DSPs), etc.) Memory 604, in turn, may comprise volatile and/or non-volatile memory and can be integrated in whole or in part with processor 602. Memory 604 preferably holds program instructions executable by processor 602, and data that is manipulated by these instructions, to carry out various logic functions described herein. Alternatively, the logic functions can be defined by hardware, firmware, and/or any combination of hardware, firmware and software.

Network interface 606 may take the form of a wireline connection, such as an Ethernet, Token Ring, SONET, or T-carrier connection. Network interface 606 may also take the form of a wireless connection, such as IEEE 802.11, BLUE-TOOTH®, CDMA, WIMAX®, UMTS®, LTE®, or any other interface used to communicate with client nodes. However, other forms of physical layer connections and other types of standard or proprietary communication protocols may be used over network interface 606. Furthermore, network interface 606 may comprise multiple physical or logical network interfaces, each capable of operating according to the same or different protocols.

Input/output function 608 facilitates user interaction with the RAN component. Input/output function 608 may comprise multiple types of input devices, such as a keyboard, a mouse, a touch screen, and so on. Similarly, input/output function 608 may comprise multiple types of output devices, such as a monitor, printer, or one or more light emitting diodes (LEDs). Additionally or alternatively, the RAN component may support remote access from another device, via network interface 606 or via another interface (not shown), such an RS-232 port.

By way of example, the data in memory 604 may contain information associated with performing any of the methods, processes, or functions described herein. For example, memory 604 data queued for WCDs served by the RAN, and/or representations of one or more multi-channel TDM transmission schedules. Memory 604 may also contain program instructions that are executable by processor 602 to perform any of the methods, processes, or functions presented herein or represented by any of the accompanying figures.

V. CONCLUSION

Exemplary embodiments have been described above. Those skilled in the art will understand, however, that changes and modifications may be made to these embodiments without departing from the true scope and spirit of the invention, which is defined by the claims.

What is claimed is:

1. A method comprising:
   a radio access network (RAN) receiving, from a first wireless communication device (WCD), a first representation of a channel, wherein the channel comprises a set of carrier frequencies, wherein the first representation of the channel is based on a first aggregate signal quality at which the first WCD receives the set of carrier frequencies, and wherein the RAN contains a first data to transmit to the first WCD;
   the RAN receiving, from a second WCD, a second representation of the channel, wherein the second representation of the channel is based on a second aggregate signal quality at which the second WCD receives the set of carrier frequencies, and wherein the RAN contains a second data to transmit to the second WCD;
   in response to receiving the first and second representations of the channel, the RAN determining (i) that the first WCD and the second WCD are contending with one another for a first time-division multiplexed (TDM) slot on the channel, and (ii) that the first aggregate signal quality is greater than the second aggregate signal quality; and
   in response to determining (i) that the first WCD and the second WCD are contending with one another for the first TDM slot and (ii) that the first aggregate signal quality is greater than the second aggregate signal quality, the RAN transmitting the first data to the first WCD in the first TDM slot.

2. The method of claim 1, further comprising:
   also in response to determining (i) that the first WCD and the second WCD are contending with one another for the first TDM slot and (ii) that the first aggregate signal quality is greater than the second aggregate signal quality, the RAN transmitting the second data to the second WCD after the RAN transmits the first data to the first WCD.

3. The method of claim 2, wherein the RAN transmits the second data in a second TDM slot, wherein the first TDM slot and the second TDM slot are both in a given TDM frame of the channel.

4. The method of claim 3, wherein the RAN uses more bits per symbol to transmit in the first TDM slot than the RAN uses to transmit in the second TDM slot.

5. The method of claim 1, further comprising:
   also in response to determining (i) that the first WCD and the second WCD are contending with one another for the first TDM slot and (ii) that the first aggregate signal quality is greater than the second aggregate signal quality, the RAN discarding the second data.

6. The method of claim 1, the method further comprising:
   the RAN receiving, from a third WCD, a third representation of the channel, wherein the third representation of the channel is based on a third aggregate signal quality at which the third WCD receives the set of carrier frequencies, and wherein the RAN contains a third data to transmit to the third WCD;
   the RAN determining that the third aggregate signal quality is greater than the second aggregate signal quality; and
   in response to determining that the third aggregate signal quality is greater than the second aggregate signal quality, the RAN (i) transmitting the third data to the third WCD after the RAN transmits the first data, and (ii) transmitting the second data to the second WCD after the RAN transmits the third data.

7. The method of claim 1, wherein the carrier frequencies in the set of carrier frequencies are contiguous.

8. The method of claim 1, wherein the carrier frequencies in the set of carrier frequencies are non-contiguous.

9. The method of claim 1, wherein determining that the first WCD and the second WCD are contending with one another for the first TDM slot comprises determining that the first data and the second data are both candidates for transmission during the first TDM slot.

10. The method of claim 1, further comprising:
    the RAN determining that both the first data and the second data are associated with a given priority,
    wherein transmitting the first data to the first WCD in the first TDM slot also occurs in response to determining that both the first data and the second data are associated with the given priority.

11. An article of manufacture including a non-transitory computer-readable medium, having stored thereon program instructions that, if executed by a radio access network (RAN), cause the RAN to perform operations comprising:
    receiving, from a first wireless communication device (WCD), a first representation of a channel, wherein the channel comprises a set of carrier frequencies, wherein the first representation of the channel is based on a first aggregate signal quality at which the first WCD receives the set of carrier frequencies, and wherein the RAN contains a first data to transmit to the first WCD;
    receiving, from a second WCD, a second representation of the channel, wherein the second representation of the channel is based on a second aggregate signal quality at which the second WCD receives the set of carrier frequencies, and wherein the RAN contains a second data to transmit to the second WCD;
    in response to receiving the first and second representations of the channel, determining (i) that the first WCD and the second WCD are contending with one another for a first time-division multiplexed (TDM) slot on the channel, and (ii) that the first aggregate signal quality is greater than the second aggregate signal quality; and in response to determining (i) that the first WCD and the second WCD are contending with one another for the first TDM slot and (ii) that the first aggregate signal quality is greater than the second aggregate signal quality, transmitting the first data to the first WCD in the first TDM slot.

12. The article of manufacture of claim 11, wherein the program instructions, if executed by the RAN, cause the RAN to perform operations further comprising:

also in response to determining (i) that the first WCD and the second WCD are contending with one another for the first TDM slot and (ii) that the first aggregate signal quality is greater than the second aggregate signal quality, transmitting the second data to the second WCD after transmitting the first data to the first WCD.

13. The article of manufacture of claim 12, wherein the RAN transmits the second data in a second TDM slot, wherein the first TDM slot and the second TDM slot are both in a given TDM frame of the channel.

14. The article of manufacture of claim 13, wherein the RAN uses more bits per symbol to transmit in the first TDM slot than the RAN uses to transmit in the second TDM slot.

15. The article of manufacture of claim 11, wherein the program instructions, if executed by the RAN, cause the RAN to perform operations further comprising:

also in response to determining (i) that the first WCD and the second WCD are contending with one another for the first TDM slot and (ii) that the first aggregate signal quality is greater than the second aggregate signal quality, discarding the second data.

16. The article of manufacture of claim 11, wherein the program instructions, if executed by the RAN, cause the RAN to perform operations further comprising:

receiving, from a third WCD, a third representation of the channel, wherein the third representation of the channel is based on a third aggregate signal quality at which the third WCD receives the set of carrier frequencies, and wherein the RAN contains a third data to transmit to the third WCD;

determining that the third aggregate signal quality is greater than the second aggregate signal quality; and in response to determining that the third aggregate signal quality is greater than the second aggregate signal quality, (i) transmitting the third data to the third WCD after the RAN transmits the first data, and (ii) transmitting the second data to the second WCD after the RAN transmits the third data.

17. The article of manufacture of claim 11, wherein the carrier frequencies in the set of carrier frequencies are contiguous.

18. The article of manufacture of claim 11, wherein the carrier frequencies in the set of carrier frequencies are non-contiguous.

19. The article of manufacture of claim 11, wherein determining that the first WCD and the second WCD are contending with one another for the first TDM slot comprises determining that the first data and the second data are both candidates for transmission during the first TDM slot.

20. The article of manufacture of claim 11, wherein the program instructions, if executed by the RAN, cause the RAN to perform operations further comprising:

determining that both the first data and the second data are associated with a given priority, wherein transmitting the first data to the first WCD in the first TDM slot also occurs in response to determining that both the first data and the second data are associated with the given priority.

* * * * *